United States Patent [19]

Sasaki et al.

[11] Patent Number: 4,891,035
[45] Date of Patent: Jan. 2, 1990

[54] SLIDE TYPE UNIVERSAL JOINT HAVING LONGITUDINAL GROOVES IN WHICH ROLLERS TRAVEL WITHOUT TILTING

[75] Inventors: Akira Sasaki; Seiji Esaki; Shigeo Kurita; Masahiro Shimizu, all of Wako, Japan

[73] Assignee: Honda Giken Kogyo Kabushiki Kaisha, Tokyo, Japan

[21] Appl. No.: 149,625

[22] Filed: Jan. 28, 1988

[30] Foreign Application Priority Data

Feb. 5, 1987 [JP] Japan .................................. 62-25098

[51] Int. Cl.$^4$ .............................................. F16D 3/20
[52] U.S. Cl. ..................................... 464/111; 464/123; 464/905
[58] Field of Search ............... 464/111, 122, 123, 124, 464/132, 120, 905

[56] References Cited

U.S. PATENT DOCUMENTS

| | | | |
|---|---|---|---|
| 4,192,154 | 3/1980 | Nakamura et al. | 464/111 |
| 4,578,048 | 3/1986 | Hirai et al. | 464/111 |
| 4,589,856 | 5/1986 | Mazziotti et al. | 464/111 |

FOREIGN PATENT DOCUMENTS

| | | | |
|---|---|---|---|
| 55-36614 | 3/1980 | Japan | 464/111 |
| 55-54721 | 4/1980 | Japan | 464/111 |
| 57-13211 | 3/1982 | Japan . | |

Primary Examiner—Daniel P. Stodola
Attorney, Agent, or Firm—Roberts, Spiecens & Cohen

[57] ABSTRACT

In a slide type universal joint mounted between two transmission shafts between which power is transmitted, to connect both the shafts in a pivotable manner, a plurality of axially extending transmission grooves are provided in an inner peripheral surface of a hollow cylindrical outer member connected to one of the transmission shafts, while radial trunnions are mounted on an inner member connected to the other transmission shaft to project into the corresponding transmission grooves of the outer member. An inner roller is slidably fitted on the outer periphery of the trunnion and in turn, a holder is fitted on the outer periphery of the inner roller for rotatable support of an outer roller which is rollable within the transmission grooves. A regulating mechanism is provided between the holder and the outer member for preventing inclination of the holder with respect to the transmission groove while permitting smooth rolling movement of the outer roller within the transmission groove.

28 Claims, 4 Drawing Sheets

SLIDE TYPE UNIVERSAL JOINT HAVING LONGITUDINAL GROOVES IN WHICH ROLLERS TRAVEL WITHOUT TILTING

FIELD OF THE INVENTION

The present invention relates to a slide type universal joint mounted, for example, in a wheel drive line in an automobile, and particularly, to a joint comprising a hollow cylindrical outer member having a plurality of angularly spaced axially extending transmission grooves in its inner peripheral surface and connected to one portion of a drive shaft, an inner member having a plurality of trunnions radially projecting into corresponding transmission grooves and connected to a second portion of the drive shaft, an inner roller slidably fitted on the outer periphery of each of the trunnions, a holder fitted on the outer periphery of the inner roller for relative universal movement thereon, and an outer roller rotatably fitted on the outer periphery of the holder and engaged in the transmission groove.

DESCRIPTION OF THE PRIOR ART

A universal joint of the above type is disclosed in Japanese patent publication No. 13211/82.

In this conventional join, if both the transmission shafts are inclined with respect to each other during power transmission, the outer roller axially rolls in the transmission groove while permitting tilting movement of the trunnion. However, as the trunnion is tilted, the outer roller is also tilted somewhat relative to the transmission groove. Due to this, resistance to rolling of the outer roller within the transmission groove is increased and vibration can be produced.

SUMMARY OF THE INVENTION

An object of the present invention is to provide a slide type universal joint of the type described above, in which the outer roller can roll axially in its respective groove while maintaining its attitude and without tendency of inclination despite tilting movement of the trunnion.

To accomplish the above object, the present invention provides regulating means between the outer member and the holder for restraining the holder from undergoing inclination relative to the outer member and rotation around the trunnion.

With the above construction, inclination of the holder is prevented by the regulating means, despite tilting movement of the trunnion and therefore, the outer roller can always be maintained in a proper attitude so as to roll smoothly in the transmission groove. This makes it possible to prevent loss of power and vibration due to tilting movement of the outer roller.

BRIEF DESCRIPTION OF THE FIGURES OF THE DRAWING

FIGS. 1 to 3 illustrate a first embodiment of a slide type universal joint of the present invention, wherein:

FIG. 1 is a longitudinal sectional view of the slide type universal joint;

FIG. 2 is a sectional view taken along line II—II in FIG. 1; and

FIG. 3 is a sectional view taken along line III—III in FIG. 2;

DETAILED DESCRIPTION OF THE PREFERRED EMBODIMENTS

Several embodiments of the present invention will now be described with reference to the accompanying drawings.

Figure 1:
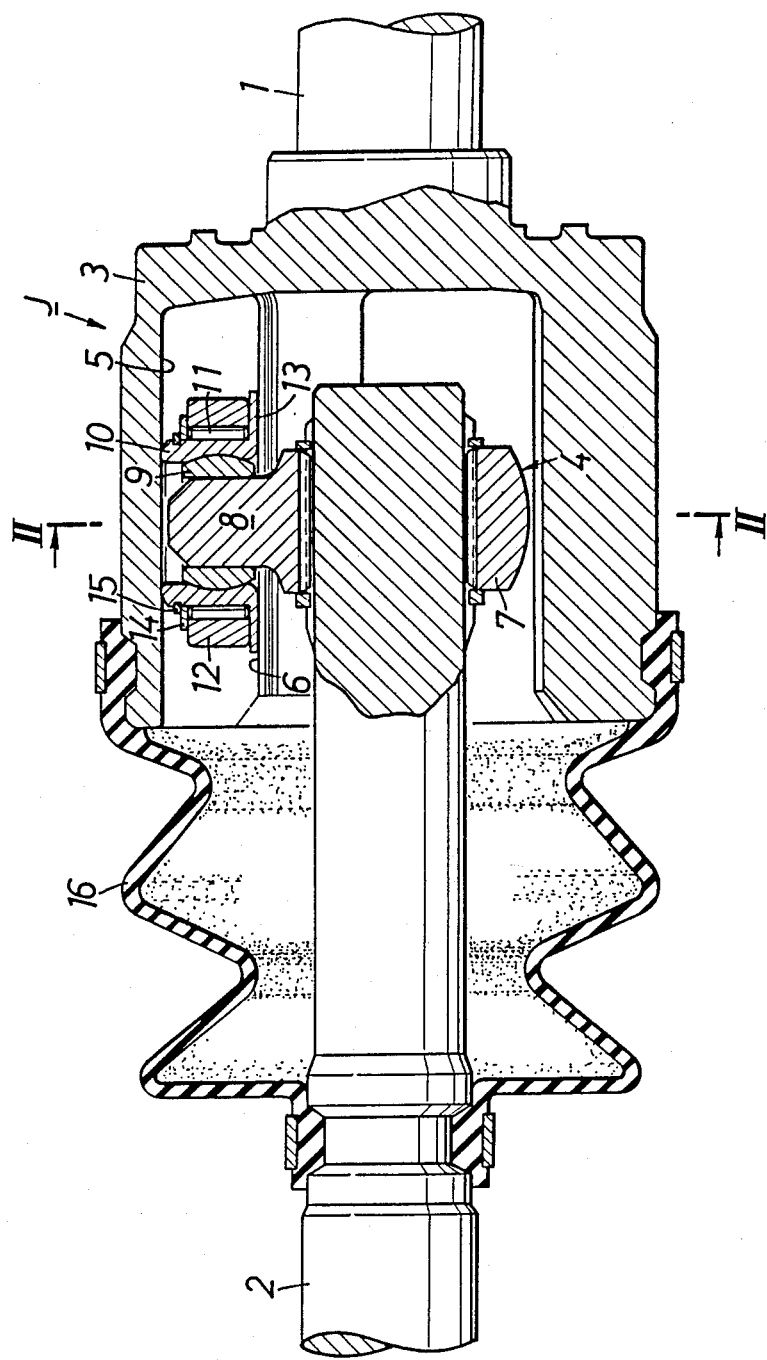
Figure 2:
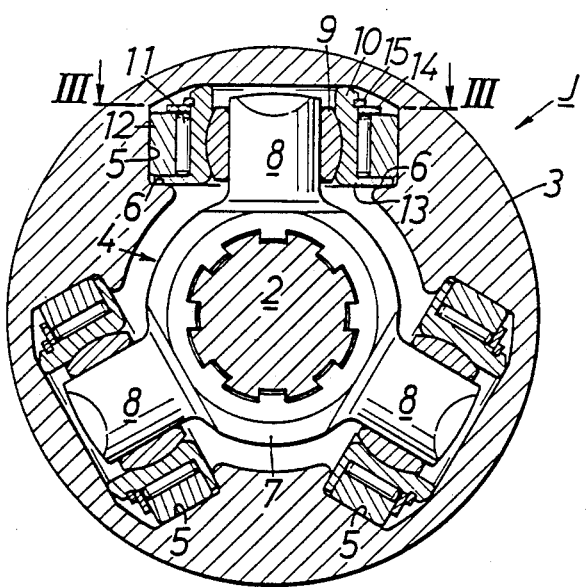
Figure 3:
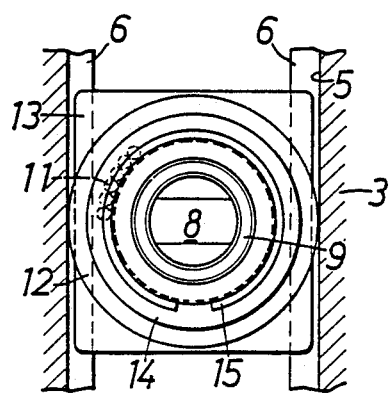

Referring first to FIGS. 1 to 3 illustrating a first embodiment, two transmission shafts 1 and 2 are connected through a slide type universal joint J according to the present invention. The joint J comprises, as primary elements, a hollow cylindrical outer member 3 integrally connected to an end of transmission shaft 1 and having its forward facing end open, and an inner member 4 secured to an end of the other transmission shaft 2 and contained within the outer member 3. A plurality of transmission grooves 5 (three in the illustrated embodiment) are provided at uniformly spaced locations in an inner peripheral surface of the outer member 3. The grooves 5 extend in an axial direction of the transmission shaft 1. A pair of step portions 6 are formed on the open edges at opposite sides of each of the transmission grooves 5 and face inwardly towards one another.

Three trunnions 8 are integrally formed to project from an outer peripheral surface of a boss 7 of the inner member 4 secured to the transmission shaft 2. The trunnions 8 project into the three transmission grooves 5 respectively.

An inner roller 9 is slidably fitted on the outer periphery of each trunnion 8 and the roller 9 has an outer surface of part spherical shape whose center is located on the axis of the trunnion 8. A holder 10 is fitted on the outer periphery of the inner roller 9 for universal rocking movement on the spherical outer surface thereof. A cylindrical outer roller 12 is rotatably fitted on the outer periphery of the holder 10 through a needle bearing 11 and is rollably engaged in the transmission groove 5.

To prevent inclination of the holder in the transmission groove 5, an outer end of the holder 10 is disposed to slidably abut against the bottom surface of the transmission groove 5, and a regulating flange 13 is integrally formed on an inner end of the holder 10 to slidably abut against the step portions 6 along planar surfaces thereof. Thereby the step portion and the regulating flange 13 constitute a regulating means of the present invention for preventing inclination of the holder 10 in the transmission groove 5, namely in the longitudinal plane of the groove.

The regulating flange 13 has a rectangular outline (FIG. 3) with the side extending in a width direction of the transmission groove 5 being slightly smaller than the side extending in the axial direction of the groove 5 and than the outside diameter of the outer roller 12, so that rotation of the holder around the trunnion and misassembly is prevented when the joint J is assembled, and rolling of the outer roller 12 is not hindered.

In addition, the step portion 6 and the regulating flange 13 abut against each other, so that when the trunnion 8 is inclined within the transmission groove 5 in an axial direction of the groove 5 due to tilting of the transmission shafts 1 and 2, the holder 10 is prevented from being inclined in the same direction with the inclined trunnion 8.

Additionally, a stopper plate 14 is attached to the holder 10 by means of a circlip 15 to act in combination with the flange 13 to prevent axial movement of the outer roller 12 in the holder.

Reference numeral 16 in FIG. 1 designates a flexible boot connected between the outer member 3 and the transmission shaft 2 to cover the open end of the outer member 3.

The operation of this embodiment will be described hereafter.

When a rotational torque is applied, for example, to the transmission shaft 1, the torque is transmitted from the outer member 3 to the inner member 4 and more specifically, from one side surface of the transmission groove 5 through the outer roller 12, the holder 10 and the inner roller 9 to the trunnion 8 and the boss 7, and then to the transmission shaft 2.

During this time, if the transmission shafts 1 and 2 are relatively inclined, so that their axes obliquely intersect each other, the inner roller 9 slides axially on the trunnion 8 while permitting tilting movement of the trunnion 8, and the outer roller 12 rolls on one side surface of the transmission groove 5. In this case, the holder 10 is prevented from undergoing inclination within the transmission groove 5 due to abutment of the step portion 6 and the regulating flange 13 so that the outer roller 12 supported on the holder 10 cannot be inclined and hence, can roll smoothly in the transmission groove 5 axially thereof.

Even when both the transmission shafts 1 and 2 are angularly displaced together, the outer roller 12 will roll smoothly in the transmission groove 5 without inclination.

Figure 4:
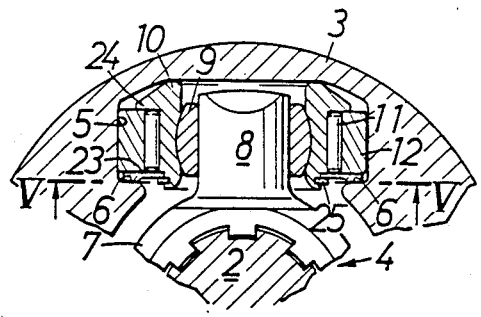
FIG. 4 is a sectional view similar to FIG. 2, showing a second embodiment of the present invention.
Figure 5:
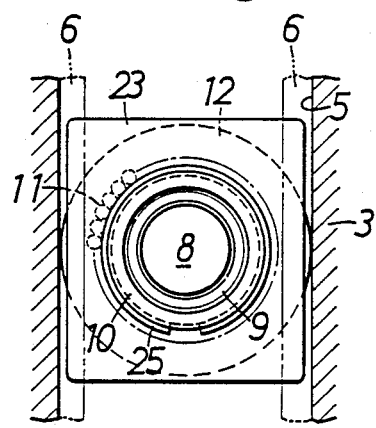
FIG. 5 is a sectional view taken along line V—V in FIG. 4.

FIGS. 4 and 5 illustrate a second embodiment of the present invention, which is of similar construction to that of the previous embodiment, except that a flange 24 for engaging one end face of the outer roller 12 is formed on the outer end of the holder 10, while a regulating plate 23 having substantially the same size and shape as the regulating flange 13 of the previous embodiment engages the other end face of the outer roller 12, the plate 23 being attached at the inner end of the holder 10 by means of a circlip 25 to engage the step portions 6. In FIGS. 4 and 5 the parts corresponding to those in the previous embodiment are denoted by the same reference numerals. In the second embodiment, the step portions 6 and the regulating plate 23 constitute the regulating means of the present invention.

Figure 6:
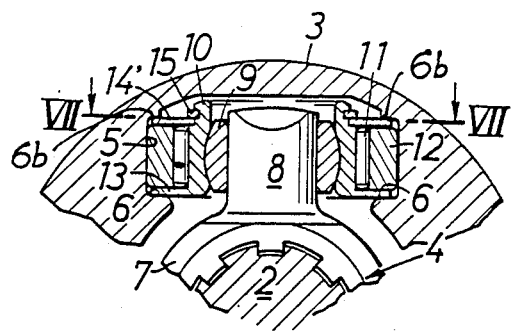
FIG. 6 is a sectional view similar to FIG. 4, showing a third embodiment of the invention.
Figure 7:
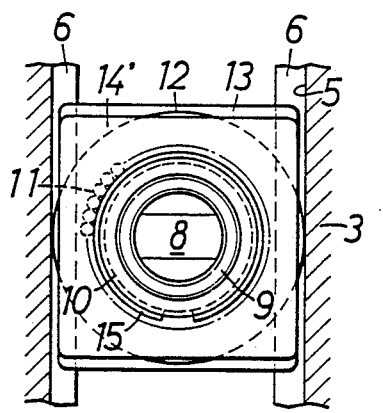
FIG. 7 is a sectional view taken along line VII—VII in FIG. 6.

FIGS. 6 and 7 illustrate a third embodiment of the present invention, which is of a similar construction to that of the first embodiment, except that instead of allowing the outer end of the holder 10 to bear against the bottom surface of the transmission groove 5, the stopper plate 14 of the earlier embodiments is formed as an enlarged plate 14' of substantially the same size and shape as the regulating flange 13 and the plate 14' is disposed to abut against a second pair of step portions 6b at the bottom surface of the transmission groove 5. In FIGS. 6 and 7 the parts corresponding to those in the first embodiment are designated by the same reference numerals.

Numerous modifications and variations of the details of the disclosed embodiments will become apparent to those skilled in the art without departing from the spirit and scope of the invention as defined int he attached claims.

What is claimed is:

1. A slide type universal joint for connecting first and second transmission shafts, said joint comprising a hollow cylindrical outer member connected to one of the transmission shafts and having a plurality of angularly spaced, axially extending transmission grooves in its inner peripheral surface, an inner member connected to the other of the transmission shafts and projecting into the hollow outer member, a plurality of trunnions radially extending on said inner member to project into corresponding transmission grooves, an inner roller slidably fitted on each of said trunnions, a holder fitted on said inner roller for universal movement thereon, an outer roller rotatably fitted on said holder and rollably engaged in a corresponding transmission groove, and regulating means between said outer member and said holder for preventing inclination of said holder relative to said outer member about an axis extending longitudinally of the corresponding groove, said regulating means comprising first means between the outer member and the holder for opposing relative movement of said holder radially inwards of said outer member and second means between the outer member and the holder for opposing relative movement of said holder radially outwards of said outer member, one of said first and second means opposing relative rotation of said holder with respect to said outer member.

2. A slide type universal joint as claimed in claim 1, wherein said first means comprises a pair of step portions facing one another at opposite side edges of each of said transmission grooves and a regulating flange movable in unison with said holder and slidably abutting against said pair of step portions.

3. A slide type universal joint as claimed in claim 2, wherein said regulating flange is of rectangular outline and has one side extending in the width direction of said transmission groove which is shorter than the side extending in the axial direction of said transmission groove.

4. A slide type universal joint as claimed in claim 2, wherein said regulating flange has a width in widthwise direction of said transmission groove which is less than the width of said transmission groove.

5. A slide type universal joint as claimed in claim 2, wherein said regulating flange is integral with said holder.

6. A slide type universal joint as claimed in claim 2 comprising means securing said regulating flange to said holder.

7. A slide type universal joint as claimed in claim 2 wherein said holder has a radially outer end in proximate facing relation to said outer member at said groove to form said second means therewith.

8. A slide type universal joint as claimed in claim 2 wherein said second means comprises a stop plate secured to said holder and engaging said outer member at a location spaced radially from said step portions to limit radial travel of said holder in said groove.

9. A slide type universal joint as claimed in claim 2 wherein said step portions have planar faces and said regulating flange has a planar surface which is slidably abutting against said planar faces of the step portions.

10. A slide type universal joint as claimed in claim 2 wherein said step portions extend axially of the associated groove and have surfaces engaging the regulating flange which are disposed in a plane perpendicular to a longitudinal plane through the longitudinal axis of the groove.

11. A slide type universal joint for connecting first and second transmission shafts, said joint comprising a hollow cylindrical outer member connected to one of the transmission shafts and having a plurality of angularly spaced, axially extending transmission grooves in its inner peripheral surface, an inner member connected to the other of the transmission shafts and projecting into the hollow outer member, a plurality of trunnions radially extending on said inner member to project into corresponding transmission grooves, an inner roller slidably fitted on each of said trunnions, a holder fitted on said inner roller for universal movement thereon, an outer roller rotatably fitted on said holder and rollably engaged in a corresponding transmission groove, and regulating means between said outer member and said holder, said regulating means being constructed to support said holder on said outer member and prevent radial movement of said holder in opposite directions for preventing inclination of said holder relative to said outer member while opposing rotational movement of said holder around the trunnion.

12. A slide type universal joint as claimed in claim 11 wherein said regulating means comprises a pair of step portions at opposite side edges of each of said transmission grooves and each having an abutment surface extending in the lengthwise direction of the groove and facing radially outwards, and portions on said holder facing radially inwards and in slidable abutment with said step portions over a span in the lengthwise direction of the groove.

13. A slide type universal joint as claimed in claim 11, wherein said regulating means comprises a pair of step portions facing one another at opposite side edges of each of said transmission grooves and a regulating flange movable in unison with said holder and slidably abutting against said pair of step portions.

14. A slide type universal joint as claimed in claim 13, wherein said regulating flange is of rectangular outline and has one side extending in the width direction of said transmission groove which is shorter than the side extending in the axial direction of said transmission groove.

15. A slide type universal joint as claimed in claim 13, wherein said regulating flange has a width in widthwise direction of said transmission groove which is less than the width of said transmission groove.

16. A slide type universal joint as claimed in claim 13, wherein said regulating flange is integral with said holder.

17. A slide type universal joint as claimed in claim 13 comprising means securing said regulating flange to said holder.

18. A slide type universal joint as claimed in claim 13 wherein said regulating means further comprises a radially outer end of the holder which is in slidable abutment against said outer member at said groove.

19. A slide type universal joint as claimed in claim 13 wherein said regulating means further comprises a stop plate secured to said holder and engaging said outer member at a location remote from said step portions to prevent outward radial travel of said holder in said groove.

20. A slide type universal joint as claimed in claim 13 wherein said step portions have planar faces and said regulating flange has a planar surface which is slidably abutting against said planar faces of the step portions.

21. A slide type universal joint as claimed in claim 13 wherein said step portions extend axially of the associated groove and have surfaces engaging the regulating flange which are disposed in a longitudinal plane through the groove.

22. A slide type universal joint for connecting first and second transmission shafts, said joint comprising a hollow cylindrical outer member connected to one of the transmission shafts and having a plurality of angularly spaced, axially extending transmission grooves in its inner peripheral surface, an inner member connected to the other of the transmission shafts and projecting into the hollow outer member, a plurality of trunnions radially extending on said inner member to project into corresponding transmission grooves, an inner roller slidably fitted on each of said trunnions, a holder fitted on said inner roller for universal movement thereon, an outer roller rotatably fitted on said holder and rollably engaged in a corresponding transmission groove, and regulating means between said outer member and said holder for preventing relative radial movement of said holder and said outer member in opposite directions and inclination of said holder relative to said outer member about an axis extending longitudinally of the corresponding groove, said regulating means comprising first means between the outer member and the holder for opposing relative movement of said holder radially inwards of said outer member and second means between the outer member and the holder for opposing relative movement of said holder radially outwards of said outer member, said first means comprising a pair of step portions facing one another at opposite side edges of each of said transmission grooves and a regulating flange movable in unison with said holder and slidably abutting against said pair of step portions, said second means comprising a second pair of step portions in each groove radially spaced from the first pair of step portions, and a stop plate secured to said holder and slidably abutting against said second pair of step portions.

23. A slide type universal joint as claimed in claim 22 wherein each groove has a bottom surface and said second pair of step portions is located in spaced relation from said bottom surface to prevent said holder from contacting said bottom surface.

24. A slide type universal joint as claimed in claim 23 wherein said stop flange and regulating plate are of substantially the same size.

25. A slide type universal joint as claimed in claim 22 wherein the first and second pair of step portions have parallel surfaces facing one another.

26. A slide type universal joint for connecting first and second transmission shafts, said joint comprising a hollow cylindrical outer member connected to one of the transmission shafts and having a plurality of angularly spaced, axially extending transmission grooves in its inner peripheral surface, an inner member connected to the other of the transmission shafts and projecting into the hollow outer member, a plurality of trunnions radially extending on said inner member to project into corresponding transmission grooves, an inner roller slidably fitted on each of said trunnions, a holder fitted on said inner roller for universal movement thereon, an outer roller rotatably fitted on said holder and rollably engaged in a corresponding transmission groove, and regulating means between said outer member and said holder, said regulating means being constructed to support said holder on said outer member and prevent radial movement of said holder in opposite directions for preventing inclination of said holder relative to said outer member, said regulating means comprising a first pair of step portions facing one another at opposite side edges of each of said transmission grooves, a regulating flange movable in unison with said holder and slidably abutting against said first pair of step portions, a second pair of step portions radially spaced from the first pair of step portions in each groove, and a stop plate secured to said holder and engaging said second pair of step portions.

27. A slide type universal joint as claimed in claim 26 wherein each groove has a bottom surface and said second pair of step portions is located in spaced relation from said bottom surface to prevent said holder from contacting said bottom surface.

28. A slide type universal joint as claimed in claim 27 wherein said stop plate and regulating flange are of substantially the same size.

* * * * *